(12) United States Patent
Warkhede et al.

(10) Patent No.: US 6,970,971 B1
(45) Date of Patent: Nov. 29, 2005

(54) METHOD AND APPARATUS FOR MAPPING PREFIXES AND VALUES OF A HIERARCHICAL SPACE TO OTHER REPRESENTATIONS

(75) Inventors: Priyank Ramesh Warkhede, Santa Clara, CA (US); Stewart Frederick Bryant, Surrey (GB)

(73) Assignee: Cisco Technology, Inc., San Jose, CA (US)

(*) Notice: Subject to any disclaimer, the term of this patent is extended or adjusted under 35 U.S.C. 154(b) by 679 days.

(21) Appl. No.: 10/042,847

(22) Filed: Jan. 8, 2002

(51) Int. Cl.⁷ .......................................... G06F 12/00
(52) U.S. Cl. ......................... 711/108; 365/49; 711/202
(58) Field of Search ...................... 711/108, 202, 206; 365/49; 370/401

(56) References Cited

U.S. PATENT DOCUMENTS

| | | | |
|---|---|---|---|
| 5,088,032 A | * | 2/1992 | Bosack |
| 5,319,763 A | * | 6/1994 | Ho et al. |
| 5,481,540 A | * | 1/1996 | Huang |
| 5,515,370 A | * | 5/1996 | Rau |
| 5,528,701 A | | 6/1996 | Aref |
| 5,651,099 A | | 7/1997 | Konsella |
| 5,721,889 A | | 2/1998 | Miller et al. |
| 5,740,171 A | * | 4/1998 | Mazzola et al. |
| 5,781,772 A | | 7/1998 | Wilkinson, III et al. |
| 5,809,501 A | | 9/1998 | Noven |
| 5,829,004 A | | 10/1998 | Au |
| 5,842,040 A | * | 11/1998 | Hughes et al. |
| 5,848,416 A | | 12/1998 | Tikkanen |
| 5,884,297 A | | 3/1999 | Noven |
| 5,898,689 A | * | 4/1999 | Kumar et al. |
| 5,920,886 A | * | 7/1999 | Feldmeier |
| 5,930,359 A | * | 7/1999 | Kempke et al. |
| 5,956,336 A | * | 9/1999 | Loschke et al. |
| 6,000,008 A | * | 12/1999 | Simcoe |
| 6,018,524 A | | 1/2000 | Turner et al. |
| 6,052,683 A | * | 4/2000 | Irwin ............................ 707/8 |
| 6,061,368 A | * | 5/2000 | Hitzelberger |
| 6,067,574 A | | 5/2000 | Tzeng |
| 6,081,440 A | * | 6/2000 | Washburn et al. ............ 365/49 |

(Continued)

FOREIGN PATENT DOCUMENTS

WO    WO 01/052063    *  7/2001    ........... G06F 9/455

OTHER PUBLICATIONS

Stefan Nilsson and Gunnar Karlsson, "IP-Address Lookup Using LC-Tries," IEEE Journal on Selected Areas in Communications, Jun. 1999 (12 pages).*

(Continued)

*Primary Examiner*—Pierre-Michel Bataille
(74) *Attorney, Agent, or Firm*—The Law Office of Kirk D. Williams

(57) ABSTRACT

Methods and apparatus are disclosed for mapping prefixes and/or values of a hierarchical space to other representations while maintaining the original hierarchy, which may be especially useful in conjunction with associative memories, such as binary and ternary content-addressable memories. In one implementation, a set of prefixes associated with a hierarchical space is received. A new representation of the set of prefixes is developed, such as by using a trie representation, with the new representation maintaining the original hierarchical relationship. This new representation may be an optimized representation selected to reduce or minimize the depth of the trie or some other cost. A set of new prefixes are generated along with a set of lookup values. During processing, a value, such as that included in a packet, is converted to one of the lookup values, which is used to generate a lookup word for use in matching against the new prefixes.

53 Claims, 12 Drawing Sheets

U.S. PATENT DOCUMENTS

| | | | |
|---|---|---|---|
| 6,091,725 A * | 7/2000 | Cheriton et al. | |
| 6,097,724 A * | 8/2000 | Kartalopoulos | |
| 6,115,716 A | 9/2000 | Tikkanen et al. | |
| 6,141,738 A * | 10/2000 | Munter et al. | 711/206 |
| 6,148,364 A * | 11/2000 | Srinivasan et al. | |
| 6,181,698 B1 * | 1/2001 | Hariguchi | |
| 6,236,658 B1 * | 5/2001 | Essbaum et al. | |
| 6,237,061 B1 | 5/2001 | Srinivasan et al. | |
| 6,243,667 B1 * | 6/2001 | Kerr et al. | |
| 6,289,414 B1 | 9/2001 | Feldmeier et al. | |
| 6,295,576 B1 * | 9/2001 | Ogura et al. | |
| 6,298,339 B1 | 10/2001 | Bjornson | |
| 6,307,855 B1 * | 10/2001 | Hariguchi | |
| 6,529,909 B1 * | 3/2003 | Bowman-Amuah | 707/10 |
| 6,717,646 B1 * | 4/2004 | Park et al. | 349/158 |
| 6,717,946 B1 | 4/2004 | Hariguchi et al. | |
| 6,775,737 B1 | 8/2004 | Warkhede et al. | |
| 2003/0174717 A1 * | 9/2003 | Zabarski et al. | 370/401 |

OTHER PUBLICATIONS

Fast IP routing with LC-Tries; achieving gbit/see speed in software, (Internet/Web/Online Service Information); Stefan Nilsson et al.; Dr. Dobb's Journal; Aug. 1998; vol. 23, No. 8, p. 70 (5).*

Donald R. Morrison, "Patricia—Practical Algorithm to Retrieve Information Coded in Alphanumeric," Journal of the ACM, vol. 15, No. 4, Oct. 1968, pp. 514-534.

Waldvogel et al., "Scalable High Speed IP Routing Lookups," Proc. SIGCOMM '97, ACM, 1997, pp. 25-36.

Lampson et al., "IP Lookups Using Multiway and Multicolumn Search," Proc. Infocom 98, Mar. 1998, 24 pages.

V. Srinivasan and George Varghese, "Faster IP Lookups using Controlled Prefix Expansion," ACM SIGMETRICS Performance Evaluation Review, vol. 26 No. 1, Jun. 1998, p. 1-10.

Stefan Nilsson and Gunnar Karlsson, "Fast Address Lookup for Internet Routers," Proceedings of IEEE Broadband Communications, Apr. 1998, 12 pages.

William N. Eatherton, Hardware-Based Internet Protocol Prefix Lookups, Master's thesis, Sever Institute, Washington University, St. Louis, MO, May 1999, 109 pages.

Lampson et al., "IP Lookups Using Multiway and Multicolumn Search," IEEE Transactions on Networking, vol. 7, No. 3, Jun. 1999, pp. 324-334.

Lockwood et al., "Field Programmable Port Extender (FPX) for Distributed Routing and Queuing," Proceedings of the ACM/SIGDA international symposium on Field programmable gate arrays, Feb. 2000, pp. 137-144.

Ruiz-Sanchez et al., "Survey and Taxonomy of IP Address Lookup Algorithms," IEEE Network Magazine, vol. 15, No. 2, Mar./Apr. 2001, pp. 8-23.

Pankaj Gupta and Nick McKewon, "Algorithms for Packet Classification," IEEE Network Magazine, vol. 15, No. 2, Mar./Apr. 2001, pp. 24-32.

Iyer et al., "ClassiPI: An Architecture for Fast and Flexible Packet Classification," IEEE Network Magazine, vol. 15, No. 2, Mar./Apr. 2001, pp. 33-41.

Waldvogel et al., "Scalable High Speed Prefix Matching," ACM Transactions on Computer Systems, vol. 19, No. 4, Nov. 2001, pp. 440-482.

Jon P. Wade and Charles G. Sodini, "A Ternary Content Addressable Search Engine," IEEE Journal of Solid-State Circuits, vol. 24, No. 4, Aug. 1989, pp. 1003-1013.

Teuvo Kohonen, Content-Addressable Memories, 1987, pp. 128-129 and 142-144, Springer-Verlang, New York.

Brian Dipert, ed., "Special-purpose SRAMs Smooth the Ride," EDN, Jun. 24, 1999, pp. 93-104.

"Extending the LANCAM Comparand," Application Brief AB-N3, Rev. 1.0a Draft, Music Semiconductors, Milpitas, CA, Sep. 30, 1998, 4 pages.

"Advantages of CAM in ASIC-Based Network Address Processing," Application Brief AB-N11, Rev. 1.2a Draft, Music Semiconductors, Milpitas, CA, Sep. 30, 1998, 4 pages.

"Virtual Memory Applications of the MU9C1480A LANCAM," Application Note AN-N3, Rev. 1a, Music Semiconductors, Milpitas, CA, Sep. 30, 1998, 12 pages.

"Using the MU9C1965A LANCAM MP for Data Wider than 128 Bits," Application Note AN-N19, Rev. 1a, Music Semiconductors, Milpitas, CA, Sep. 30, 1998, 16 pages.

"Fast IPv4 and IPv4 CIDR Address Translation and Filtering Using the MUAC Routing CoProcessor (RCP)," Application Note AN-N25, Rev. 0a, Music Semiconductors, Milpitas, CA, Oct. 1, 1998, 16 pages.

"Using MUSIC Devices and RCPs for IP Flow Recognition," Application Note AN-N27, Rev. 0, Music Semiconductors, Milpitas, CA, Oct. 21, 1998, 20 pages.

"Wide Ternary Searches Using Music CAMs and RCPs," Application Note AN-N31, Rev. 0, Music Semiconductors, Milpitas, CA, Apr. 13, 1999, 8 pages.

* cited by examiner

550 ↘

```
create_anc_tree ( trie_node, anc_tree_node) {
        /* Creates ancestor tree for sub-trie rooted at trie_node, and
         * anchors the ancestor tree at anc_tree_node as root.
         */
        if ( IS_PREFIX(trie_node) )
                anc_tree_node = create_child (anc_tree_root,trie_node);
        if ( NOT_LEAF(trie_node) ) {
                create_anc_tree ( trie_node->left, anc_tree_node);
                create_anc_tree ( trie_node->right, anc_tree_node);
        }
}
```

```
find_cost(v) {
        list_of_subtrees = { u | u \in children(v) }
        while ( SIZE_OF(list_of_leaves) > 1 ) {
                u = delete_min_cost_element ( list_of_subtrees);
                v = delete_min_cost_element ( list_of_subtrees);
                node = new_node();
                node->left = u; node->right = v;
                node->cost = v->cost + 1;
                insert_element ( list_of_subtrees, node);
        }
        return list_of_elements[0]->cost;
}
```

FIGURE 5C

EXEMPLARY TRIE
REPRESENTATION OF
ORIGINAL PREFIXES

EXEMPLARY
ANCESTOR TREE

EXEMPLARY
ANCESTOR TREE COST

EXEMPLARY OPTIMIZED
ENCODING OF
ANCESTOR TREE

EXEMPLARY TRIE
REPRESENTATION OF
MAPPED PREFIXES

| EXEMPLARY NODE IDENTIFIER 661 | EXEMPLARY ORIGINAL PREFIX 662 | EXEMPLARY MAPPED PREFIX 663 | EXEMPLARY LOOKUP VALUE 664 |
|---|---|---|---|
| A | * | * | 010 |
| B | 00 | 00 | 000 |
| C | 1* | 1* | 111 |
| D | 10 | 100 | 100 |
| E | 110 | 101 | 101 |
| F | 1111 | 110 | 110 |

METHOD AND APPARATUS FOR MAPPING PREFIXES AND VALUES OF A HIERARCHICAL SPACE TO OTHER REPRESENTATIONS

FIELD OF THE INVENTION

This invention especially relates to mapping prefixes and values of a hierarchical space to other representations; and more particularly, the invention relates to mapping prefixes and values of a hierarchical space to another representations using a trie representation.

BACKGROUND OF THE INVENTION

The communications industry is rapidly changing to adjust to emerging technologies and ever increasing customer demand. This customer demand for new applications and increased performance of existing applications is driving communications network and system providers to employ networks and systems having greater speed and capacity (e.g., greater bandwidth). In trying to achieve these goals, a common approach taken by many communications providers is to use packet switching technology. Increasingly, public and private communications networks are being built and expanded using various packet technologies, such as Internet Protocol (IP).

A network device, such as a switch or router, typically receives, processes, and forwards or discards a packet based on one or more criteria, including the type of protocol used by the packet, addresses of the packet (e.g., source, destination, group), and type or quality of service requested. Additionally, one or more security operations are typically performed on each packet. But before these operations can be performed, a packet classification operation must typically be performed on the packet.

Packet classification as required for access control lists (ACLs) and forwarding decisions is a demanding part of switch and router design. This packet classification of a received packet is increasingly becoming more difficult due to ever increasing packet rates and number of packet classifications. For example, ACLs require matching packets on a subset of fields of the packet flow label, with the semantics of a sequential search through the ACL rules. IP forwarding requires a longest prefix match.

One known approach uses binary and/or ternary content-addressable memories to perform packet classification. Ternary content-addressable memories allow the use of wildcards in performing their matching, and thus are more flexible than binary content-addressable memories. These content-addressable memories are expensive in terms of power consumption and space, and are limited in the size of an input word (e.g., 72, 144, 288 bits, etc.) on which a lookup operation is performed as well as the number of entries which can be matched.

Various applications that use packet classification, such as Security Access Control, Quality of Service etc., typically need to match source and/or destination addresses. These addresses can be quite large, and possibly too large for providing all bits representing one or more addresses to a content-addressable memory. For example, Internet Protocol version 6 (IPv6) uses addresses having a length of 128 bits and a typical large content-addressable memory has a maximum search width of 288 bits. Therefore, almost all the bits of a content-addressable memory would be used for matching the source and destination addresses, while providing a small, and quite possibly insufficient number of input bits for matching other criteria such as source and destination port numbers, protocol and other header fields, etc. Needed are new methods and apparatus for performing lookup operations, especially for IPv6 and other addresses, using content-addressable memories and other devices.

SUMMARY OF THE INVENTION

Systems and methods are disclosed for mapping prefixes and/or values of a hierarchical space to other representations. In one embodiment, a first representation of a hierarchical relationship among a multiple first prefixes is generated. An optimized representation of the hierarchical relationship among the multiple first prefixed is determined. A mapping of the plurality of first prefixes into a plurality of second prefixes is generated based on the optimized representation.

BRIEF DESCRIPTION OF THE DRAWINGS

The appended claims set forth the features of the invention with particularity. The invention, together with its advantages, may be best understood from the following detailed description taken in conjunction with the accompanying drawings of which:

FIGS. 5B–C are pseudo code representations of processes used in one embodiment for determining an ancestor tree and a cost of an encoding of a mapping.

DETAILED DESCRIPTION

Figure 1:
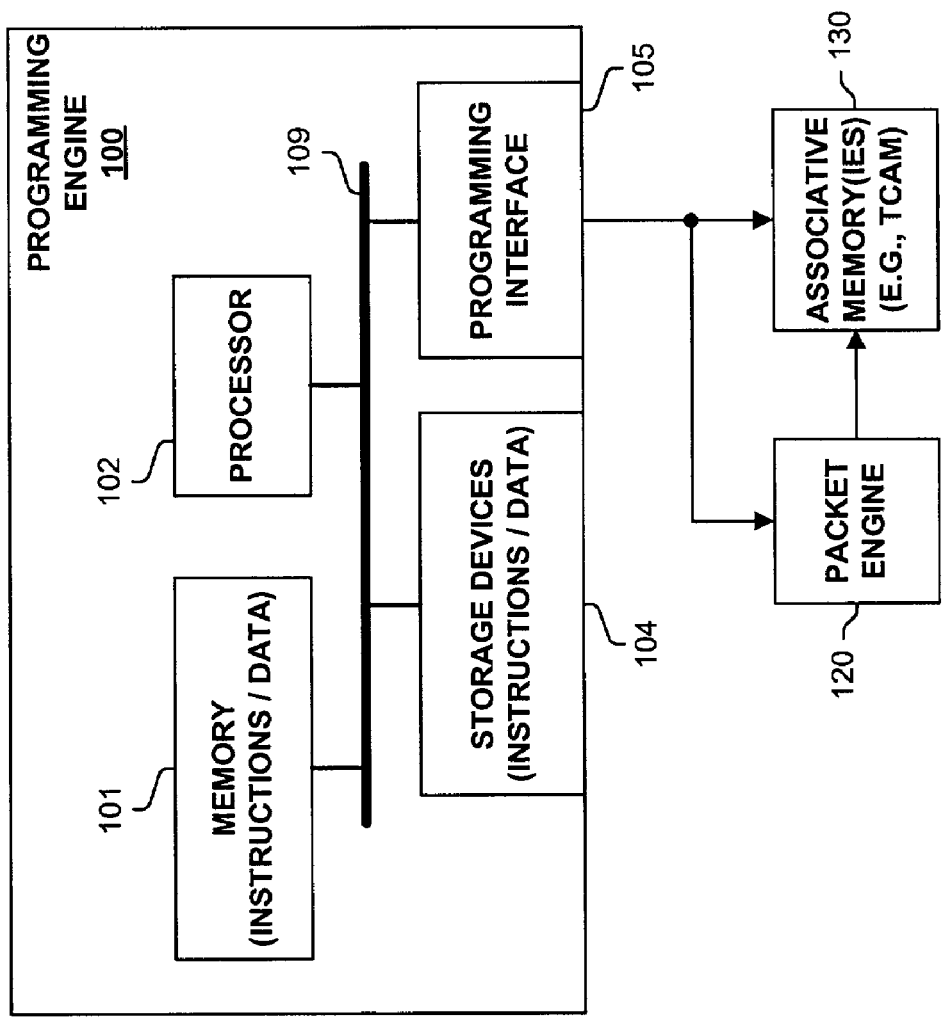
FIGS. 1 and 2A are block diagrams of embodiments for mapping and using prefixes in conjunction with associative memories.

Methods and apparatus are disclosed for mapping prefixes and/or values of a hierarchical space to other representations while maintaining the original hierarchy, which may be especially useful in conjunction with associative memories, such as, but not limited to binary and ternary content-addressable memories (CAMs). Embodiments described herein include various elements and limitations, with no one element or limitation contemplated as being a critical element or limitation. Each of the claims individually recite an aspect of the invention in its entirety. Moreover, some embodiments described may include, but are not limited to, inter alia, systems, networks, integrated circuit chips, embedded processors, ASICs, methods, and computer-readable medium containing instructions. The embodiments described hereinafter embody various aspects and configurations within the scope and spirit of the invention, with the figures illustrating exemplary and non-limiting configurations.

As used herein, the term "packet" refers to packets of all types, including, but not limited to, fixed length cells and variable length packets, each of which may or may not be divisible into smaller packets or cells. Moreover, these packets may contain one or more types of information, including, but not limited to, voice, data, video, and audio information. Furthermore, the term "system" is used generically herein to describe any number of components, elements, sub-systems, devices, packet switch elements, packet switches, routers, networks, computer and/or communication devices or mechanisms, or combinations of components thereof. The term "computer" is used generically herein to describe any number of computers, including, but not limited to personal computers, embedded processors and systems, control logic, ASICs, chips, workstations, mainframes, etc. The term "device" is used generically herein to describe any type of mechanism, including a computer or system or component thereof. The terms "task" and "process" are used generically herein to describe any type of running program, including, but not limited to a computer process, task, thread, executing application, operating system, user process, device driver, native code, machine or other language, etc., and can be interactive and/or non-interactive, executing locally and/or remotely, executing in foreground and/or background, executing in the user and/or operating system address spaces, a routine of a library and/or standalone application, and is not limited to any particular memory partitioning technique. The steps and processing of signals and information illustrated in the figures are typically be performed in a different serial or parallel ordering and/or by different components in various embodiments in keeping within the scope and spirit of the invention. Moreover, the terms "network" and "communications mechanism" are used generically herein to describe one or more networks, communications mediums or communications systems, including, but not limited to the Internet, private or public telephone, cellular, wireless, satellite, cable, local area, metropolitan area and/or wide area networks, a cable, electrical connection, bus, etc., and internal communications mechanisms such as message passing, interprocess communications, shared memory, etc. The terms "first," "second," etc. are typically used herein to denote different units (e.g., a first element, a second element). The use of these terms herein does not necessarily connote an ordering such as one unit or event occurring or coming before the another, but rather provides a mechanism to distinguish between particular units. Additionally, the extensible disclosure herein may refer a data structure, component, system, element, etc. in the singular tense, the disclosure is extensible and such discussion implies zero, one, or more than one of the particular item; and the converse is also true. Moreover, the phrase "based on x" is used to indicate a minimum set of items x from which something is derived, wherein "x" is extensible and does not necessarily describe a complete list of items on which the operation is based. Additionally, the phrase "coupled to" is used to indicate some level of direct or indirect connection between two elements or devices, with the coupling device or devices modify or not modifying the coupled signal or communicated information. Moreover, the term "or" is used herein to identify an alternative selection of one or more, including all, of the conjunctive items.

In one view, a trie is a directed path through a tree with each path through the tree qualified by a unique result. Each child of a trie is associated with a symbol from a finite alphabet depending on its relation to its parent node. A binary trie is a directed path through a binary tree with each path through the tree qualified by a unique result. This unique result is typically codified by the path taken with a one or zero representing a left or right path taken to reach the desired node. A prefix is typically a string of characters that appears at the beginning of a longer string of characters or it may be a string in and of itself. In many cases of practical interest the characters in a prefix are binary digits (i.e., ones and zeroes). A prefix is sometimes terminated by a wildcard, such as an asterisk, which represents the remaining arbitrary binary digits in a longer, fixed-length or arbitrary length string.

Methods and apparatus are disclosed for mapping prefixes and/or values of a hierarchical space to other representations while maintaining the original hierarchy, which may be especially useful in conjunction with associative memories, such as, but not limited to binary and ternary content-addressable memories. Typically, in the original space, a longest matching operation is performed using a value on a set of prefixes. It is typically important that the same results occur in a mapped spaced. Thus, in one embodiment, the new mapped space must maintain certain attributes of the original space, such as the same hierarchical structure and longest matching attributes.

In one embodiment, a set of prefixes associated with a hierarchical space is received. A new representation of the set of prefixes is developed, such as by using a trie representation, with the new representation maintaining the original hierarchical relationship. This new representation may be an optimized representation selected to reduce or minimize the depth of the trie or some other cost. A set of new prefixes are generated along with a set of lookup values. During processing, a value, such as that included in a packet, is converted to one of the lookup values, which is used to generate a lookup word for use in matching against the new prefixes. A new representation may be generated for each of multiple spaces for any parameter or parameters which will be used in a lookup operation and for any processing function. For example, in a communications device such as a router, these spaces include, but are not to limited network addresses (e.g., source, destination, etc.), port numbers, quality of service parameters, and policing values. These packet processing functions include, but are not limited to destination, policy-based, priority and other types of routing, netflow operations, netflow statistic, quality of service, and policing functions. Of course, the spaces and functions used are dependent on the particular application of one embodiment.

FIG. 1 illustrates one embodiment of a system, which may be part of a router or other communications or computer system, for mapping prefixes and/or values of a hierarchical space to other representations while maintaining the original hierarchy, which may be especially useful in conjunction with associative memories, such as, but not limited to binary and ternary CAMs. In one embodiment, programming engine 100 receives a set of prefixes associated with a space. A hierarchical representation of the set of prefixes is developed, such as by using a trie representation, while maintaining the hierarchical relationship among of original prefixes. This hierarchical representation may be an optimized representation selected to reduce or minimize the depth of the trie or some other cost. A translation mapping is established to map an original prefix into its new representation and to a lookup value. Packet engine 120 and one or more associative memories 130 are typically programmed with these mapped identifiers, prefixes and/or values.

In one embodiment, programming engine 100 includes a processor 102, memory 101, storage devices 104, and programming interface 105, which are electrically coupled via one or more communications mechanisms 109 (shown as a bus for illustrative purposes). Various embodiments of programming engine 100 may include more or less elements. The operation of programming engine 100 is typically controlled by processor 102 using memory 101 and storage devices 104 to perform one or more tasks or processes. Memory 101 is one type of computer-readable medium, and typically comprises random access memory (RAM), read only memory (ROM), flash memory, integrated circuits, and/or other memory components. Memory 101 typically stores computer-executable instructions to be executed by processor 102 and/or data which is manipulated by processor 102 for implementing functionality in accordance with the invention. Storage devices 104 are another type of computer-readable medium, and typically comprise solid state storage media, disk drives, diskettes, networked services, tape drives, and other storage devices. Storage devices 104 typically store computer-executable instructions to be executed by processor 102 and/or data which is manipulated by processor 102 for implementing functionality in accordance with the invention.

Figure 2A:
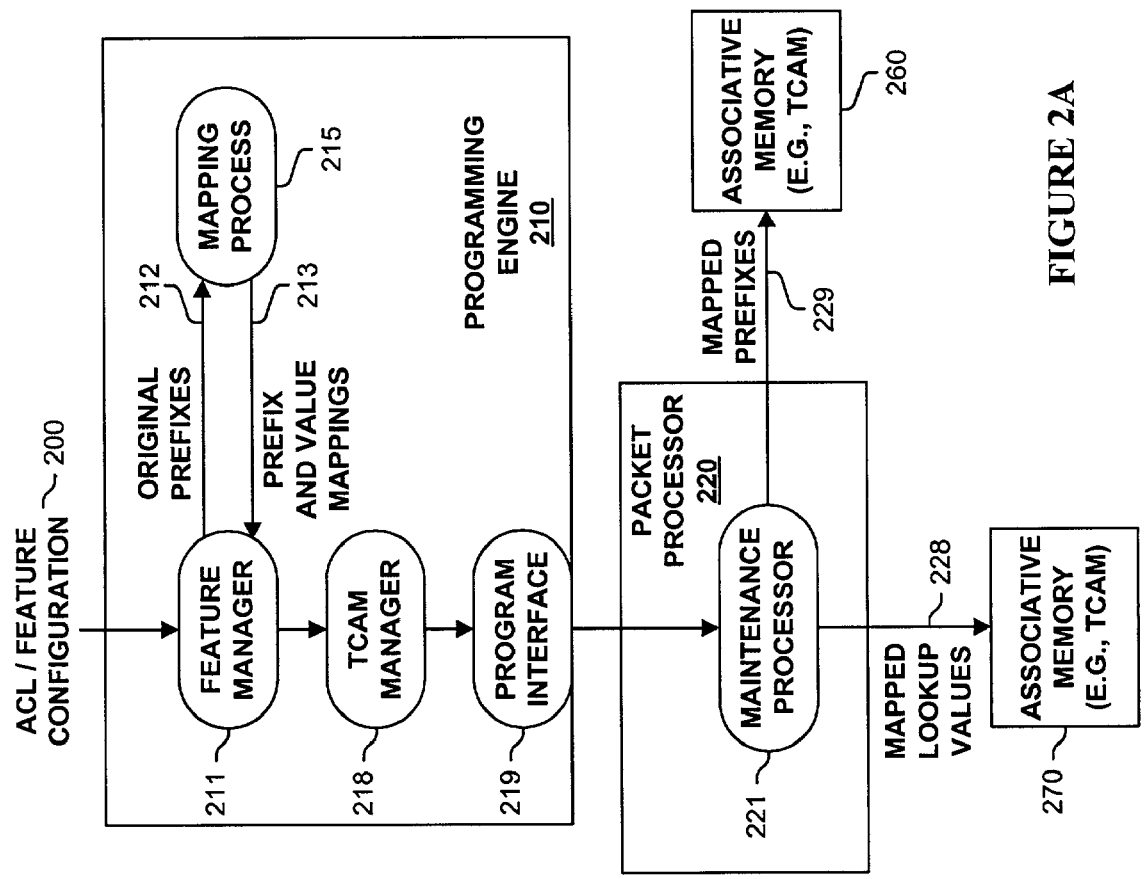

FIG. 2A illustrates one embodiment of a system, which may be part of a router or other communications or computer system, for mapping prefixes and values of a hierarchical space to other representations, which may be especially useful in conjunction with associative memories. In one embodiment, programming engine 210 receives an access control list (ACL) and/or other feature configuration information 200. A feature management module 211 receives this information 200 and communicates original prefixes 212 to a mapping process 215, which analyzes and produces a mapping of the original prefixes to new prefixes and/or values which maintain the same hierarchical relationship of the original prefixes. Prefix and value mappings 213 and possibly received configuration information 200 is forwarded by feature manager module 211 to TCAM manager 218 and then to program interface 219, and then on to maintenance processor 221 of packet processor 220. Maintenance processor 221 then updates associative memory 260 with mapped prefixes 229 and associative memory 270 with mapped lookup values 228. In one embodiment, a data structure is used in place of, or in addition to associative memories 260 and 270. In one embodiment, a single associative memory is used in place of associative memories 260 and 270. In one embodiment, associative memories 260 and/or 270 include multiple associative memories.

Figure 2B:
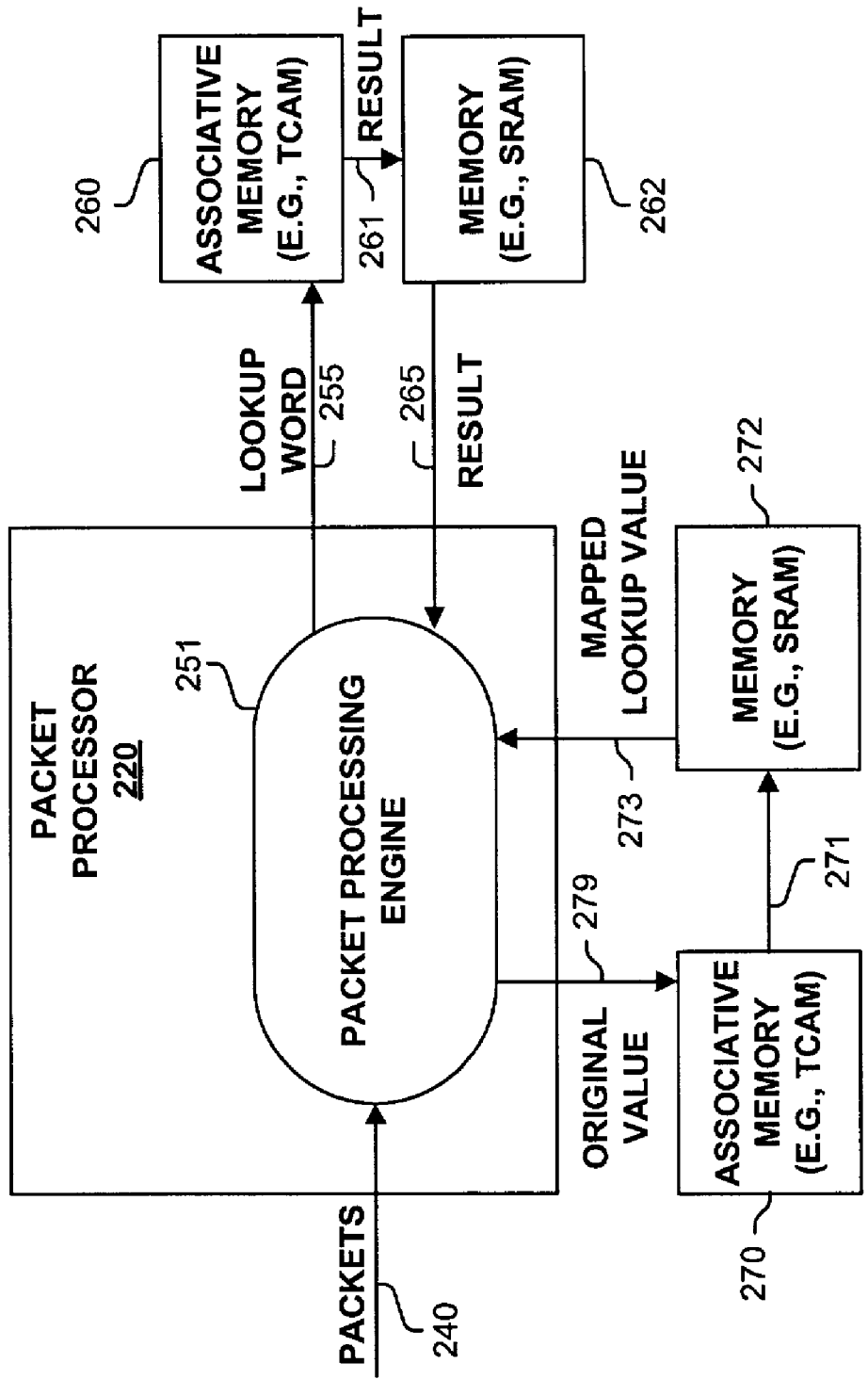
FIGS. 2B–C are block diagrams of exemplary embodiments performing packet processing.

FIG. 2B illustrates one aspect of the processing of packets 240 by packet processor 220. Packets 240 are received by packet processing engine 251, which extracts original value 279 within a space and provides it to associative memory 270. If a match is found, the result 271 is provided to memory 272, which returns the mapped lookup value 273 to packet processing engine 251. In one embodiment, result 271 is returned to packet processor 220. One or more lookup words 255 are generated based on the one or more mapped lookup values 273 and possibly along with other information included in one of the receives packets 240 or from another source or statically or dynamically programmed. For example, separate lookup words 255, each including mapped lookup value 273 and typically at least one different other parameter, are generated for security filtering, policy based routing, and netflow statistics applications. In one embodiment, one or more lookup words 255 included mapped lookup values 273 from different mapped spaces, such as, but not limited to source and destination addresses spaces, with typically a conversion operation performed for each space to produce the multiple lookup values. In one embodiment, more than one associative memories 270 and memories 272 are used for identifying mapped lookup values 273. In one embodiment, the same associative memory 270 and memory 272 are used for generating lookup values 273 for each of the spaces. In one embodiment, a single physical associative memory 270 is virtually partitioned into subsections, with each subsection being independently accessed based on a unique subsection identifier field assigned to each entry, wherein each entry of a subsection has the same subsection identifier field.

After the one or more lookup values 273 are generated, a lookup operation is typically performed by associative memory 260 to produce result 261, which is typically used as input to a memory (e.g., SRAM) 262 to produce a result 265 for use by packet processor 220. In one embodiment, result 261 is returned to packet processor 220 in processing one or more of the received packets 240. In one embodiment, lookup word 255 includes multiple mapped lookup values 273, while in one embodiment, lookup word 255 includes a single mapped lookup value 273. In one embodiment, a single associative memory includes entries used in converting original lookup values 279 to mapped lookup values 273 and entries used in performing a lookup operation on lookup words 255.

Figure 2C:
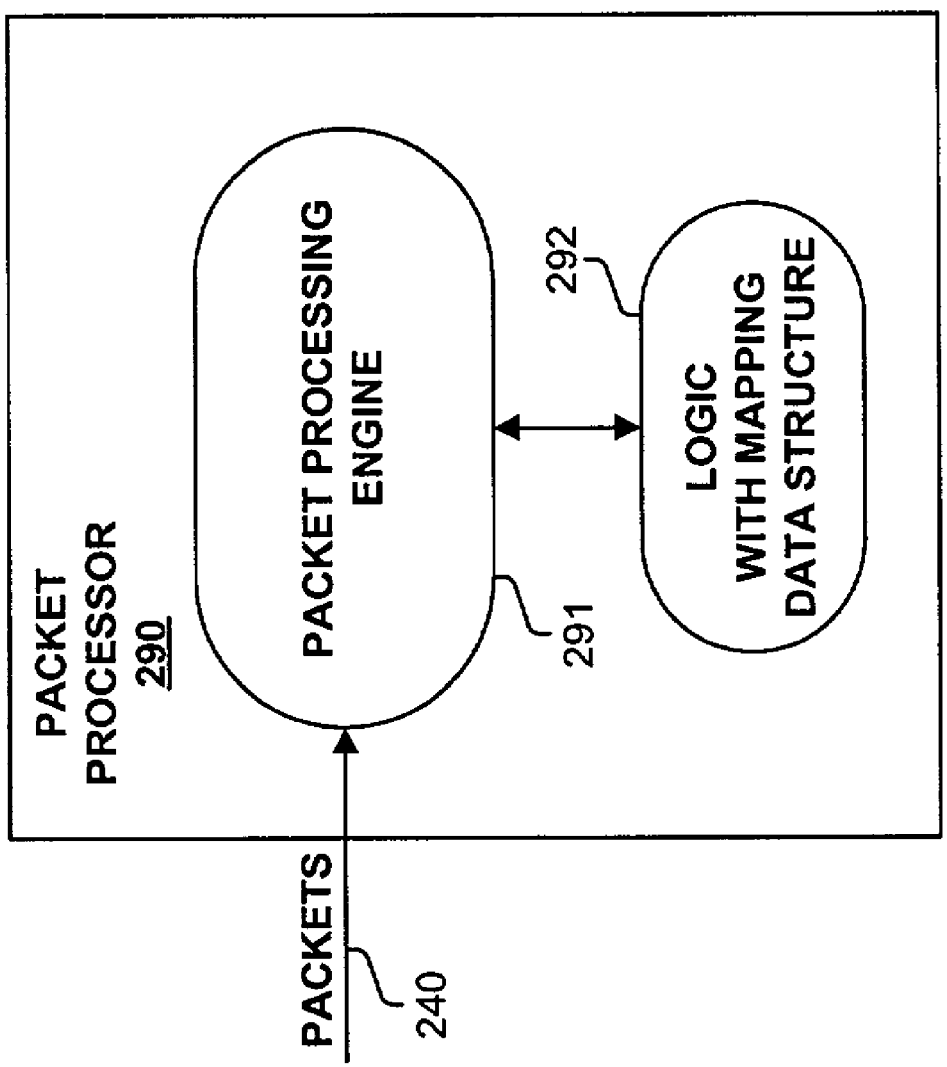

FIG. 2C illustrates one embodiment of a packet processor 290 and packet processing engine 291, which performs one or more of the lookup operations using logic with mapping data structure 292, rather than, or in addition to one or more of the associative memories, such as associative memories 260 and 270 (FIG. 2B).

Figure 3:
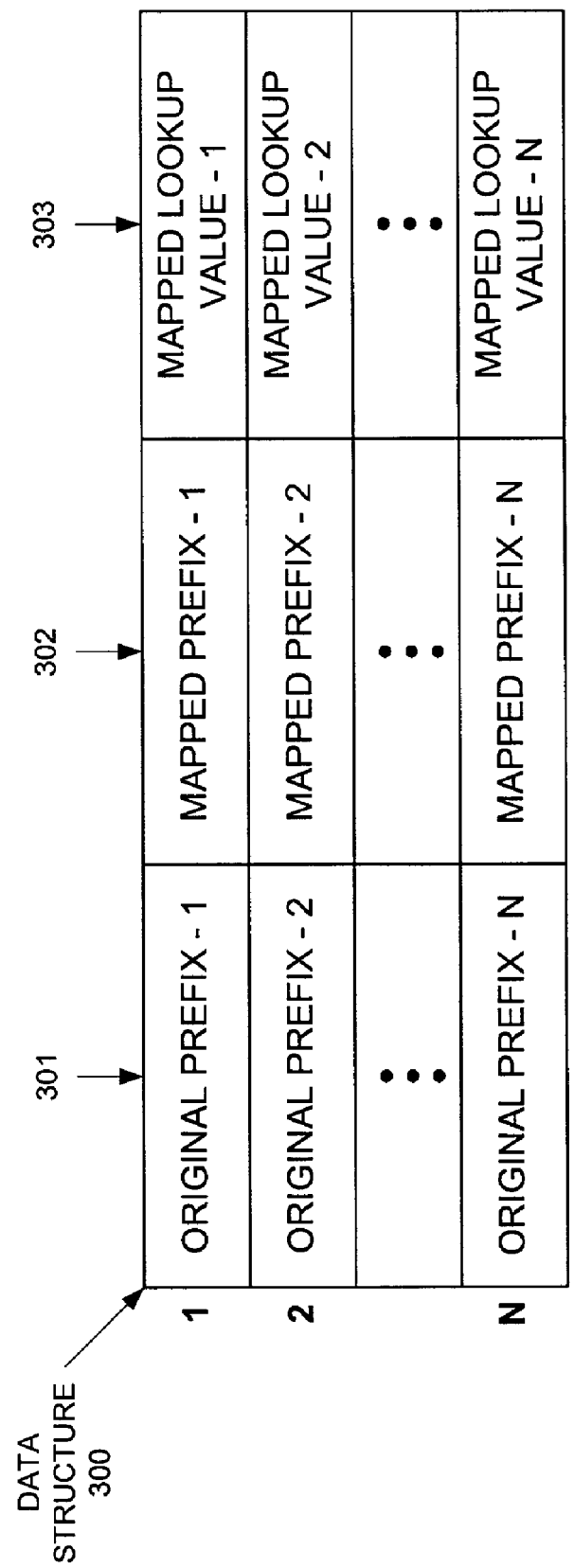
FIG. 3 is a block diagram of a data structure used in one embodiment to maintain mappings between original and resultant prefixes and lookup values.

FIG. 3 illustrates a data structure 300 which is used in one embodiment to maintain mapping information. Data structure 300 corresponds to a data structure maintained in one embodiment of memory 101 (FIG. 1) and/or in logic with prefix mapping data structure 292 (FIG. 2C). Data structure 300 maintains a list of original prefix values 301 and a corresponding mapped prefix 302 and mapped lookup value 303 for each prefix value 301.

Figure 4A:
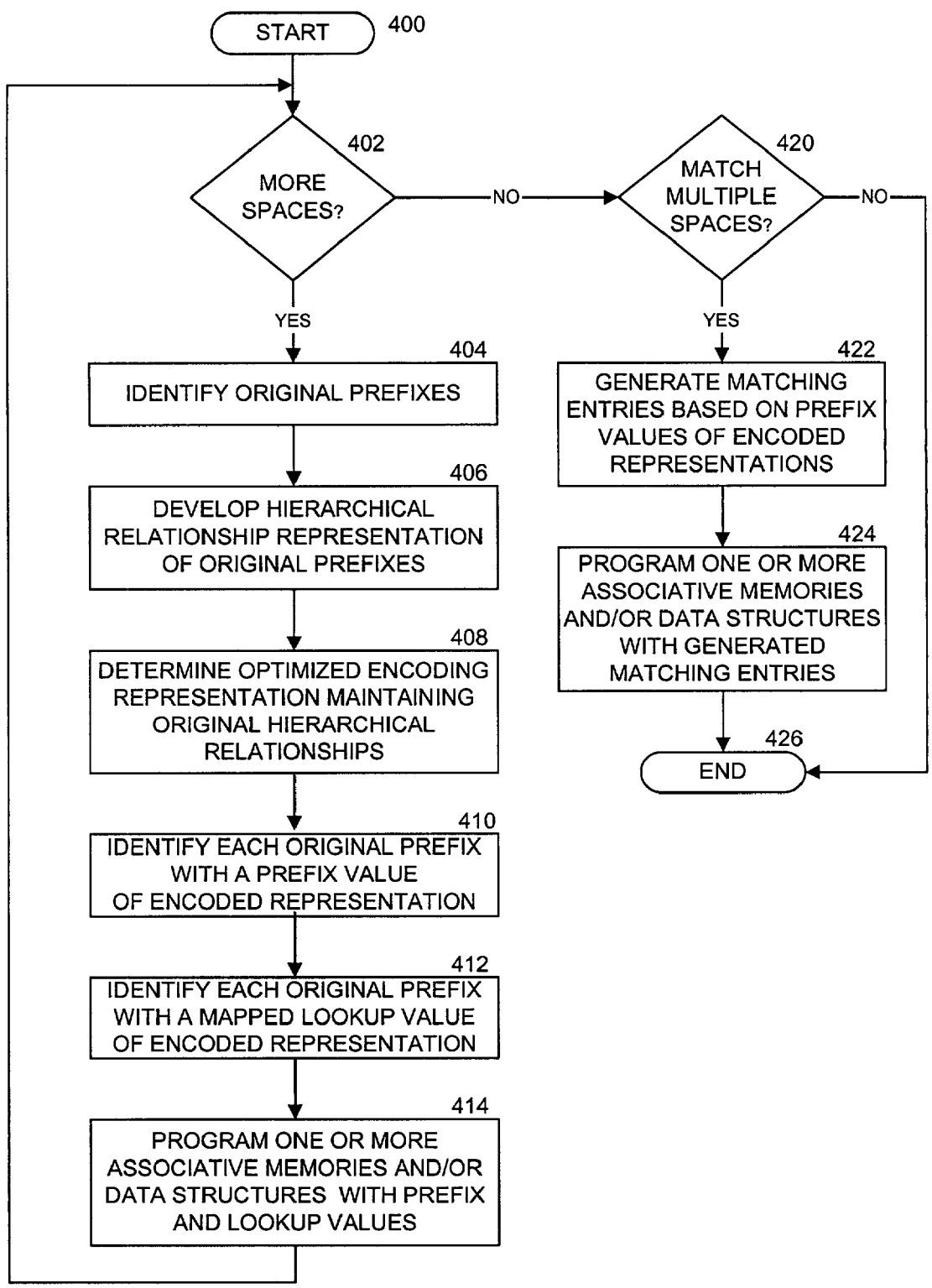
FIG. 4A is a flow diagram of a process used in one embodiment for mapping original prefixes to resultant prefixes and lookup values.

FIG. 4A illustrates one process for mapping prefixes and values of a hierarchical space to other representations for each of one or more spaces. Processing begins with process block 400, and proceeds to process block 402. While there are more spaces to process, in process block 404, the original prefixes are identified of a particular space, such as, but not limited to receiving them from another process, retrieving them from a data structure, extracting them from an access control list, etc. Next, in process block 406, a hierarchical relationship representation of the original prefixes is built. Next, in process block 408, an optimized encoding is determined while maintaining the original hierarchical relationship. In process block 410, each original prefix is assigned a corresponding prefix based on the optimized encoding. Next, in process block 412, each original prefix is further identified with a mapped lookup value. In process block 414, one or more associative memories and/or mapping data structures are programmed with the mapped prefix and lookup values. Typically, these mapped prefixes are stored in an associative memory in decreasing order of prefix length or maintained in a data structure in such a manner so as to produce a longest prefix match. Processing then return to process block 402 to generate mappings for any remaining spaces.

When all address spaces have been processed as determined in process block 402, then, as determined in process block 420, if a match is to be performed using lookup values and prefixes from multiple spaces, then in process blocks 422 and 424, the matching entries are generated based on the prefix values of previously generated new hierarchical representations, and one or more associative memories and/or data structures are programmed with these generated entries. Processing is complete as indicated by process block 426.

Figure 4B:
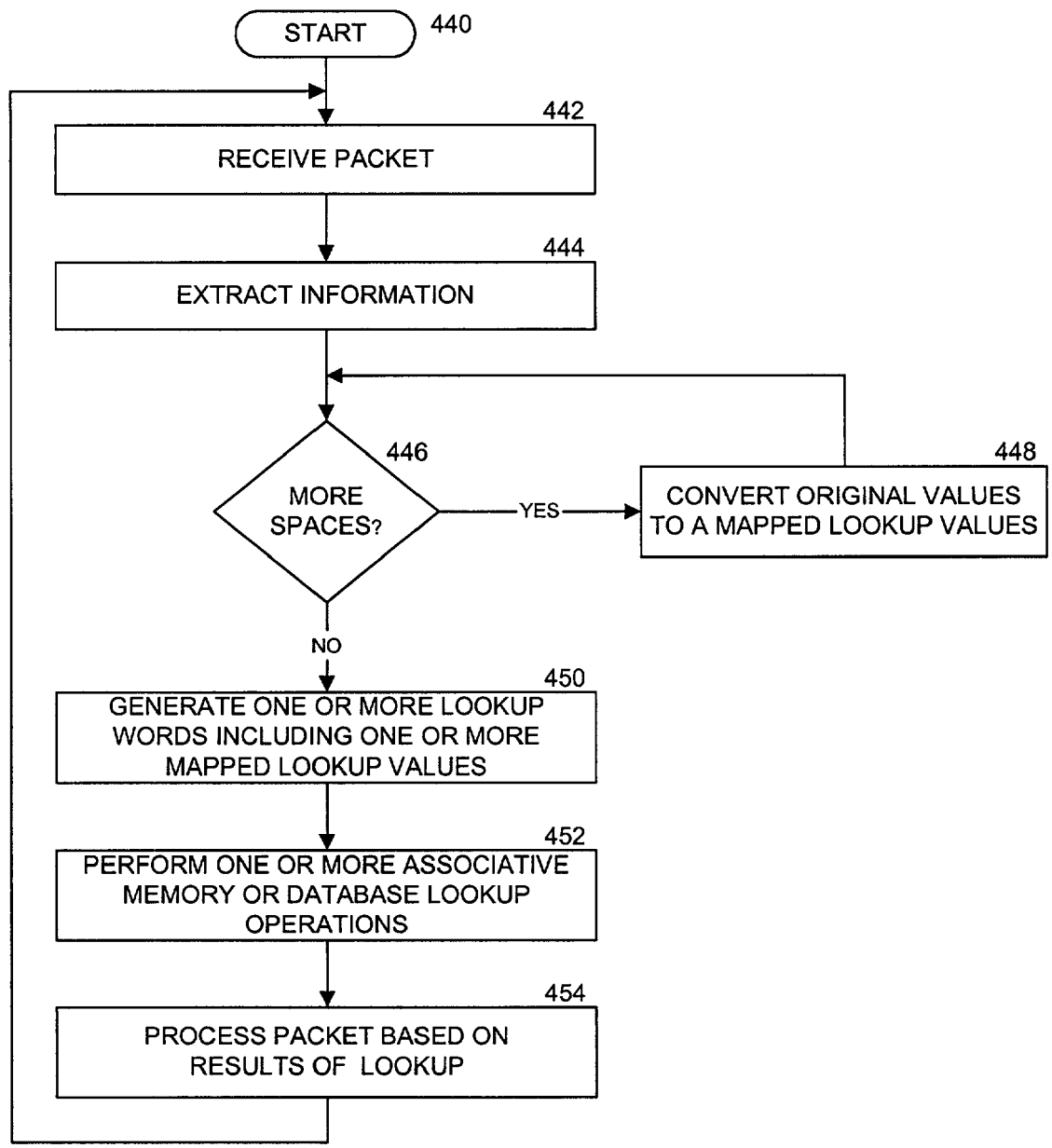
FIG. 4B is a flow diagram of a process used in one embodiment for using the resultant prefixes and lookup values in the processing of packets.

FIG. 4B illustrates a process used in one embodiment for processing information.

Note, this processing is described in terms of receiving and processing packets. However, the invention is extensible, and not limited to processing packets. Rather, the invention may be used for processing any type of information.

Processing begins with process block 440, and proceeds to process block 442, wherein a packet is received. Next, in process block 444, information (e.g., source address, destination address, port fields, service type, or other packet header or data fields) is extracted on which to perform a lookup and matching operations. Next, as determined in process block 446, while there are more spaces associated with the extracted information, convert the original values of a particular space to lookup values by typically finding the longest matching prefix in the prefix mapping data structure in process block 448. Next, in process block 450, one or more lookup words are generated including one or more lookup values previously generated. In one embodiment, multiple lookup words include a same lookup value (e.g., a source or destination address), in which case, an original value need only be converted to its corresponding lookup value once. Next, in process block 452, one or more associative memory, database, or other lookup operations are performed using the one or more generated lookup words. In process block 454, a packet is processed or other operation performed based on the results of the lookup operation. Processing returns to process block 442 to receive and process more packets.

Figure 5A:
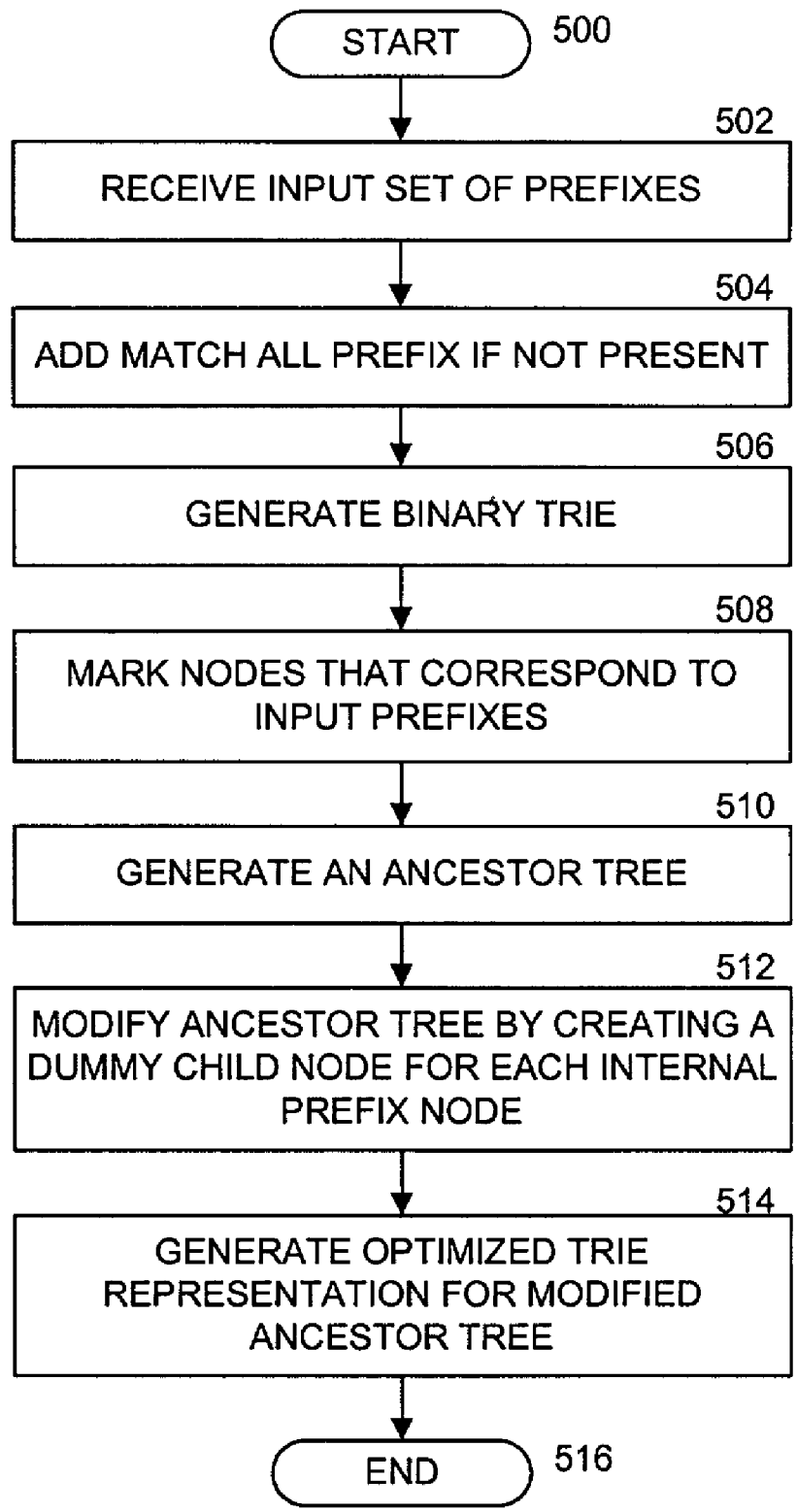
FIG. 5A is a flow diagram of a process used in one embodiment for generating an optimized mapped representation of prefixes from a hierarchical space.

FIGS. 5A–C illustrate an embodiment of one or more process used in determining a mapping of prefixes and values of a hierarchical space to other representations. In addition, FIGS. 6A–F will be used to further illustrate the processing performed in relation to FIGS. 5A–C by illustrating the processing for an example set of input prefixes A–F.

Figure 6A:
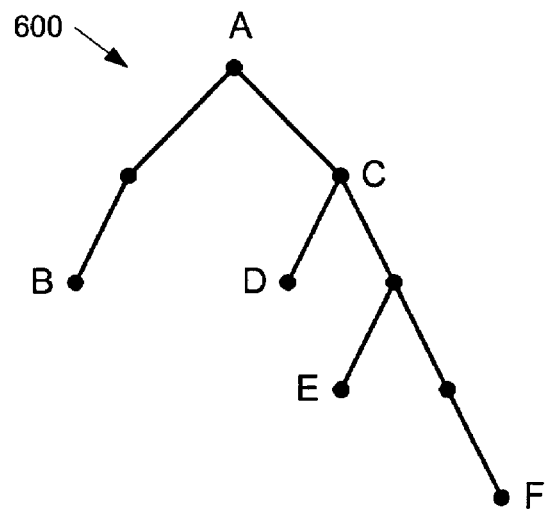
FIGS. 6A–F present an exemplary process for mapping prefixes and values of a hierarchical space to another representation.

Turning first to FIG. 5A, processing begins with process block 500, and proceeds to process block 502, wherein an input set of prefixes is received (or identified, retrieved from a data structure, extracted from an access control list, etc.) Next, in process block 504, a match all prefix is added to the set of prefixes if it is not already present. In process block 506, a binary trie representation of the set of prefixes is built and in process block 508, the nodes that correspond to prefixes in the set of prefixes are marked. FIG. 6A illustrates this processing by one such trie representation 600 for original prefixes A–F (or B–F with all matching prefix A added.)

Figure 6B:
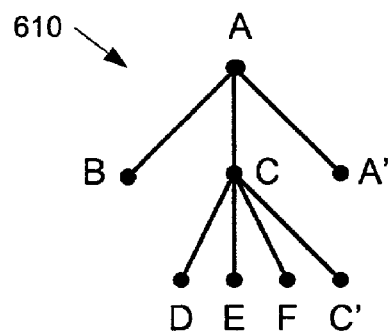

Next in process block 510 of FIG. 5A, an ancestor tree is generated. An ancestor prefix with a wildcard appended to it will match each of its child prefixes. The hierarchical relationship of the original prefixes must be maintained in the mapped prefixes. Next, in process block 512, the ancestor tree is modified by creating a dummy child node for each internal (i.e., non-leaf) prefix node, which is used to maintain the hierarchical relationship among prefixes when mapping the original prefixes. Typically, all values are not included in the original set of received prefixes. These dummy nodes represent any and all addresses or values which have the corresponding prefix as its longest match, and will be used to identify a corresponding lookup value. For any prefix, the set of such addresses or values may not be contiguous and may even be empty. FIG. 6B illustrates one example of an ancestor tree for prefixes A–F and dummy nodes A' and C'. Additionally, FIG. 5B illustrates a pseudo code representation 550 used in one embodiment to generate an ancestor tree by recursively traversing the trie representation and building the ancestor tree.

Next, in process block 514, an optimized trie representation is generated for the modified ancestor tree. For example, the cost is defined in one embodiment as the number of bits required to represent a value or address, which is equivalent in one embodiment to the depth of the mapped trie representation.

Figure 6C:
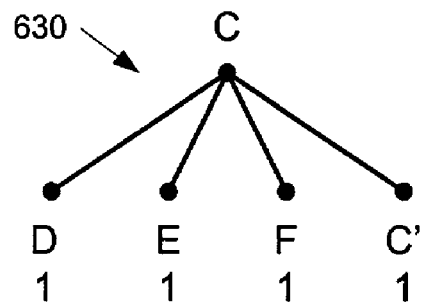
Figure 6D:
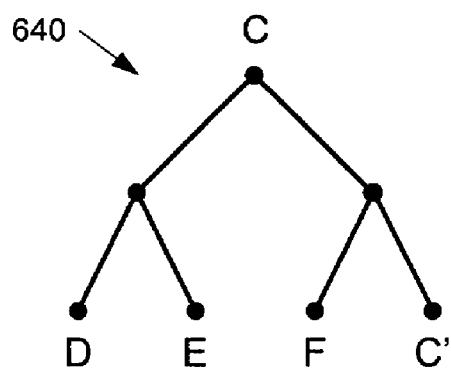
Figures 6E, 6F:
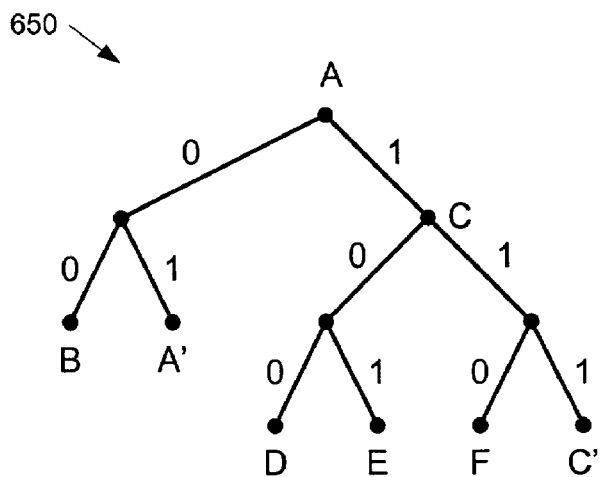

For example, illustrated in FIG. 6C is a portion 630 of ancestor tree 610 with associated costs listed below each leaf node. In one embodiment attempting to minimize the length of a longest prefix, the costs represent the cost in terms of the size (e.g., number of bits) required to represent a subtrie of a given node, which is one if a given node has no children. An optimized encoding of the ancestor tree will want to minimize the highest cost of encoding a single value. For example, FIG. 6D illustrates an optimized encoding 640 for nodes C-F with their associated costs as illustrated in FIG. 6C. FIG. 6E illustrates one optimized trie representation 650 for input prefixes A–F. FIG. 6F illustrates for each of the exemplary node identifiers 661 (i.e., A–F) and dummy nodes A' and C', the exemplary original prefix 662 (derived from the trie representation 600 illustrated in FIG. 6A), and the exemplary mapped prefix value 663 (derived from trie representation 650 of the mapped prefixes as illustrated in FIG. 6E). Also, lookup values 664 are derived for each leaf node of trie representation 650, with the value corresponding to its trie value, with internal nodes using the value of their corresponding dummy node. In one embodiment, each of the lookup values 664 has a same length, and entries having a shorter trie value are lengthened by appending one or more values (e.g., 1 or 0).

FIG. 5C illustrates a pseudo code representation 560 used in one embodiment to determine a minimal cost of encoding using a trie representation of the mapped prefixes while maintaining the hierarchical relation of the original prefixes. In one embodiment, the cost of encoding is defined as the maximum number of bits used to represent any prefix. A cost $c(v)$ of a node v in the ancestor tree is defined in one embodiment as the maximum number of bits required to encode the sub-tree rooted at v. For example, if v is a leaf, then cost of encoding v is 0; if v has two leaf children then cost of encoding sub-tree rooted at v is $\log(2)=1$. Pseudo code representation 560 computes an optimized solution of minimizing encoding cost using a bottom-up recursive process. At any node v, the costs of all its children are already computed, so the problem to be solved at node v is as follows. Given a set children(v) of n elements, each associated with a positive integer weight w( ), construct a binary tree with these elements as leaves, such that max(weight of leaf+path length from root) is minimized. Pseudo code representation 560 computes one such optimized solution.

Processing of the flow diagram illustrated in FIG. 5A is completed as indicated by process block 516.

In view of the many possible embodiments to which the principles of our invention may be applied, it will be appreciated that the embodiments and aspects thereof described herein with respect to the drawings/figures are only illustrative and should not be taken as limiting the scope of the invention. For example and as would be apparent to one skilled in the art, many of the process block operations can be re-ordered to be performed before, after, or substantially concurrent with other operations. Also, many different forms of data structures could be used in various embodiments. The invention as described herein contemplates all such embodiments as may come within the scope of the following claims and equivalents thereof.

What is claimed is:

1. A method comprising:
   determining a binary trie representation for a plurality of prefixes;
   determining an ancestor tree based on the binary trie representation;
   determining an optimized trie representation of the ancestor tree; and
   determining a mapping of the plurality of the prefixes into a plurality of second prefixes based on the optimized trie representation.

2. The method of claim 1, further comprising extracting the plurality of prefixes from a configuration table.

3. The method of claim 1, wherein the configuration table contains access control, quality of service, or routing information.

4. The method of claim 1, further causing an associative memory to be programmed with the plurality of second prefixes.

5. The method of claim 4, wherein the associative memory is a content-addressable memory.

6. The method of claim 1, further comprising determining a set of mapped lookup values based on the optimized representation.

7. The method of claim 6, further comprising causing the plurality of mapped lookup values to be stored in an associative memory.

8. A method comprising:
   generating a first representation of a hierarchical relationship among a plurality of first prefixes, which includes determining an ancestor tree based on the plurality of first prefixes;
   determining an optimized representation of the hierarchical relationship among the plurality of first prefixes, which includes determining an optimized trie representation of the ancestor tree; and
   generating a mapping of the plurality of first prefixes into a plurality of second prefixes based on the optimized representation.

9. The method of claim 8, wherein the first representation includes a trie.

10. The method of claim 9, wherein optimized representation includes a trie.

11. The method of claim 8, further comprising causing an associative memory to be programmed with the plurality of second prefixes.

12. The method of claim 11, wherein the associative memory includes a binary or ternary content-addressable memory.

13. The method of claim 8, further comprising storing the plurality of second prefixes in a data structure.

14. The method of claim 8, further comprising maintaining a data structure indicating the mapping.

15. The method of claim 8, wherein the plurality of first prefixes include a network address.

16. The method of claim 8, including adding a dummy node for each internal node of the first representation.

17. The method of claim 8, wherein the plurality of second prefixes includes a match all prefix.

18. The method of claim 8, wherein the plurality of second prefixes includes a dummy node for an internal node of the first representation.

19. The method of claim 8, further comprising determining a set of mapped lookup values based on the optimized representation.

20. The method of claim 19, further comprising causing the plurality of mapped lookup values to be stored in an associative memory.

21. A method of claim 8, further comprising:
   receiving a set of information including a first value;
   generating a lookup value from the set of mapped lookup values based on first value; and
   generating a lookup word based the lookup value.

22. The method of claim 21, further comprising:
   causing an associative memory to be programmed with the plurality of second prefixes; and
   initiating a lookup operation on the associative memory using the lookup word.

23. An apparatus comprising:
   means for determining a binary trie representation for a plurality of prefixes;
   means for determining an ancestor tree based on the binary trie representation;
   means for determining an optimized trie representation of the ancestor tree; and
   means for determining a mapping of the plurality of the prefixes into a plurality of second prefixes based on the optimized trie representation.

24. The apparatus of claim 23, further comprising means for programming an associative memory with the plurality of second prefixes.

25. An apparatus comprising:
   a programming engine for determining a mapping between a plurality of first prefixes having a hierarchical relationship and a plurality of second prefixes having the hierarchical relationship;
   a storage mechanism configured to maintain an indication of the mapping;
   translation logic to determine a particular one of the plurality of second prefixes based on a particular one of the plurality of first prefixes; and
   an associative memory to perform a lookup operation using the particular one of the plurality of second prefixes to generate a result;
   wherein the programming engine includes an optimizer for determining an ancestor tree based on the plurality of first prefixes; wherein the programming engine references the ancestor tree when determining the mapping.

26. The apparatus of claim 25, wherein the programming engine includes an associative memory programmer to program the associative memory.

27. The apparatus of claim 25, wherein the plurality of first prefixes correspond to a plurality of network addresses.

28. The apparatus of claim 25, wherein the plurality of prefixes are derived from an access control list.

29. The apparatus of claim 25, wherein the associative memory is a content-addressable memory.

30. The apparatus of claim 25, wherein the programming engine is further configured to determine a set of lookup values based on the set of first prefixes.

31. The apparatus of claim 30, further comprising a second associative memory for storing the set of lookup values.

32. An apparatus comprising:
   means for generating a first representation of a hierarchical relationship among a plurality of first prefixes, which includes means for determining an ancestor tree based on the plurality of first prefixes;
   means for determining an optimized representation of the hierarchical relationship among the plurality of first prefixes, which includes determining an optimized trie representation of the ancestor tree; and
   means for generating a mapping of the plurality of first prefixes into a plurality of second prefixes based on the optimized representation.

33. The apparatus of claim 32, wherein the first representation includes a trie.

34. The apparatus of claim 32, wherein optimized representation includes a trie.

35. The apparatus of claim 32, further comprising means for programming an associative memory with the plurality of second prefixes.

36. The apparatus of claim 32, further comprising means for determining a set of mapped lookup values based on the optimized representation.

37. The apparatus of claim 36, further comprising means for generating a lookup value from the set of mapped lookup values based on a particular value.

38. One or more computer-readable media containing computer-executable instructions for performing operations, said operations comprising:
   determining a binary trie representation for a plurality of prefixes;
   determining an ancestor tree based on the binary trie representation;
   determining an optimized trie representation of the ancestor tree; and
   determining a mapping of the plurality of the prefixes into a plurality of second prefixes based on the optimized trie representation.

39. The computer-readable media of claim 38, wherein said operations comprise extracting the plurality of prefixes from a configuration table.

40. The computer-readable media of claim 38, wherein the configuration table contains access control, quality of service, or routing information.

41. The computer-readable media of claim 38, wherein said operations comprise causing an associative memory to be programmed with the plurality of second prefixes.

42. The computer-readable media of claim 41, wherein the associative memory is a content-addressable memory.

43. The computer-readable media of claim 38, wherein said operations comprise determining a set of mapped lookup values based on the optimized representation.

44. The method of claim 43, wherein said operations comprise causing the plurality of mapped lookup values to be stored in an associative memory.

45. One or more computer-readable media containing computer-executable instructions for performing operations, said operations comprising:
   generating a first representation of a hierarchical relationship among a plurality of first prefixes, which includes determining an ancestor tree based on the plurality of first prefixes;
   determining an optimized representation of the hierarchical relationship among the plurality of first prefixes, which includes determining an optimized the representation of the ancestor tree; and
   generating a mapping of the plurality of first prefixes into a plurality of second prefixes based on the optimized representation.

46. The computer-readable media of claim 45, wherein said operations comprise causing an associative memory to be programmed with the plurality of second prefixes.

47. The computer-readable media of claim 46, wherein said operations comprise storing the plurality of second prefixes in a data structure.

48. The computer-readable media of claim 45, wherein said operations include adding a dummy node for each internal node of the first representation.

49. The computer-readable media of claim 45, wherein the plurality of second prefixes includes a dummy node for an internal node of the first representation.

50. The computer-readable media of claim 45, wherein said operations comprise determining a set of mapped lookup values based on the optimized representation.

51. The computer-readable media of claim 50, wherein said operations comprise causing the plurality of mapped lookup values to be stored in an associative memory.

52. The computer-readable media of claim 45, wherein said operations comprise:
   receiving a set of information including a first value;
   generating a lookup value from the set of mapped lookup values based on first value; and
   generating a lookup word based the lookup value.

53. The computer-readable media of claim 52, wherein said operations comprise:
   causing an associative memory to be programmed with the plurality of second prefixes; and
   initiating a lookup operation on the associative memory using the lookup word.

* * * * *

UNITED STATES PATENT AND TRADEMARK OFFICE
CERTIFICATE OF CORRECTION

PATENT NO. : 6,970,971 B1
DATED : November 29, 2005
INVENTOR(S) : Warkhede et al.

It is certified that error appears in the above-identified patent and that said Letters Patent is hereby corrected as shown below:

Column 12,
Line 13, replace "the" with -- trie --.

Signed and Sealed this

Seventh Day of March, 2006

JON W. DUDAS
*Director of the United States Patent and Trademark Office*